United States Patent Office 3,546,140
Patented Dec. 8, 1970

3,546,140
LOW TEMPERATURE SHIFT REACTIONS
William R. Gutmann, Louisville, and Raymond E. Johnson, Anchorage, Ky., assignors to Catalysts & Chemicals Inc., Louisville, Ky., a corporation of Delaware
No Drawing. Filed Sept. 14, 1967, Ser. No. 667,667
Int. Cl. B01j 11/06
U.S. Cl. 252—466                                 8 Claims

ABSTRACT OF THE DISCLOSURE

Copper-zinc oxide catalysts permit the water gas shift reaction to be conducted at temperatures below 500° F. The catalyst precursor is known to be sensitive to steam during reduction. Precursors are provided herein which can be reduced with steam present without loss of activity.

BACKGROUND OF THE INVENTION

This invention pertains to low temperature shift catalysts, and particularly to precursor compositions therefor. Low temperature shift catalysts made from copper oxide and zinc oxide combinations are known and these are the subject of U.S. 3,303,001 and U.S. 3,388,972, filed Dec. 14, 1966. The low temperature shift catalysts described in the prior art are made by the reduction of precursors which contain a mixture of copper oxide and zinc oxide such that zinc and copper are present in a weight ratio based on metal of 0.5 to 3 zinc and 1 copper. In some instances 1 to 55 percent aluminum oxide is included, based on the finished catalyst, to improve the thermal resistance and activity of catalyst. In preparing low temperature shift catalysts derived from copper oxide and zinc oxide, several methods can be employed.

According to one method of preparing copper oxide-zinc oxide catalyst precursors, mixtures of solutions of soluble copper and zinc salts, for instance their chlorates, chlorides, sulfates, nitrates and acetates, are coprecipitated as carbonates in amounts resulting in the copper-zinc ratios set forth hereinbefore. It is generally preferred to employ the nitrates, and to coprecipitate by the addition of sodium carbonate. Thus a dilute aqueous solution of the copper and zinc salts is combined with a dilute aqueous solution of sodium carbonate, forming the coprecipitate by the double decomposition.

The copper-zinc low temperature shift catalysts of U.S. 3,303,001 and U.S. 3,388,972 are highly active long lasting catalysts. However, as pointed out in U.S. 3,388,-972, these catalysts are nevertheless sensitive to steam reduction. The effect of overheating and of steam on copper-zinc low temperature shift catalysts is treated in U.S. 3,390,102. In that patent it is pointed out that copper oxide-zinc oxide catalyst precursors are subject to damage by overheating, and that the use of a completely hydrogen stream brings about a temperature rise leading to this high heat state. As a consequence copper-zinc catalysts have not been activated commercially with hydrogen with any degree of uniformity. The hydrogen stream must be diluted with a carrier or diluent gas. It is also pointed out in U.S. 3,390,102 that whereas steam has been effectively used in the laboratory, the use of steam as a diluent in commercial operation results in a less active catalyst. Commercial data show that steam is not suitable as a reducing gas diluent where high activity is desired. The diluent gas should contain less than 40 percent, preferably no steam. Diluent gases are nitrogen, methane, ethane, propane, and carbon dioxides; however steam frequently is the most readily available gas stream.

SUMMARY OF THE INVENTION

Low temperature copper-zinc catalysts of the prior art are derived from a mixture of zinc oxide and copper oxide such that the zinc and copper are present in a weight ratio based on metal of 0.5 to 2 zinc to 1 copper, desirably 2 zinc to 1 copper. In accordance with the practice of this invention it has been found that steam can be used effectively as a carrier gas for hydrogen if this zinc to copper ratio is increased beyond that employed heretofore. This invention thus provides a zinc copper catalyst precursor capable of being reduced with steam as a carrier gas for hydrogen to produce a low temperature shift catalyst without loss of activity during said reduction due to steam. The precursor contains zinc oxide and copper oxide in a weight ratio of zinc to copper based on metal of over 3:1 and up to 5:1, preferably 3.5:1 to 4.5:1. The precursor contains 45 to 100 percent of the zinc oxide-copper oxide combination and 0 to 55 percent of another metal oxide such as $Fe_2O_3$, $Al_2O_3$, $TiO_2$ and $M_gO$. Various methods of preparing the catalysts are described in U.S. 3,303,001, and such methods are contemplated herein. If alumina or another metal oxide is incorporated in the composition it can be added or precipitated at any stage in the catalyst preparation before the required zinc oxide and copper oxide composition is calcined. Various methods of adding alumina are described in U.S. 3,388,972, and those methods are also intended to be a part of this invention.

DETAILED DESCRIPTION OF THE INVENTION

Since low temperature shift catalysts of the type contemplated herein must be reduced with hydrogen or carbon monoxide in a carrier gas, it is of particular importance that steam be useable because it is generally used in the plant for other purposes. The advantages of a high zinc to copper ratio insofar as reduction with a steam stream is concerned can best be exemplified by comparative activity data obtained using various zinc to copper ratios. Activities are reported as $K_w$ values. The $K_w$ value as used herein is an activity constant. It is a simplified form of a reaction rate constant for a first order reaction. This constant is discussed in Chemical Process Principles, Part III, by Olaf Hougan and K. Watson, John Wiley & Sons, Inc., 1947, and in I&EC, vol. 41, August 1950, p. 1600. As used herein $$K_w = SV_w \log_{10} \frac{1}{1-\text{fraction of theoretical conversion}}$$

$$= SV_w \log_{10} \frac{CO \text{ in} - CO \text{ at equilibrium}}{CO \text{ out} - CO \text{ at equilibrium}}$$

where $SV_w$ is the wet space velocity defined as the total volume of wet gas measured in standard cubic feet (s.c.f.), at 1 atmosphere and 60° F. per hour per cubic foot of catalyst. In other words, this is the time term in the reaction rate constant expression. The CO in the above expression can be expressed in any units so long as the units are consistent for the CO concentration in the inlet, CO in the outlet, and CO at equilibrium. The constant $K_w$ may not adequately express the true mechanism of the shift reaction over the catalyst in mathematical terms. However, it has been found to be a reliable means of expressing the activity from bench scale tests and for designing commercial units.

The low temperature shift catalysts employed herein were prepared as follows, the quantities of copper and zinc salts being varied to give the desired zinc to copper ratios.

EXAMPLE 1

Preparation of the catalyst

To 4300 parts by weight of a 16 percent sodium carbonate solution heated to 140° F., are added 2620 parts by weight of an 8 percent (based on metal) solution consisting of zinc and copper nitrates in a mol ratio (also based on metal) of one zinc to one copper, heated to 90° F. The 8 percent metal solution is made by mixing 482 parts by weight of $Zn(NO_3)_2 \cdot 6H_2O$ and 478 parts by weight of $Cu(NO_3)_2 \cdot 6H_2O$ with 1670 parts by weight of water. The zinc carbonate-copper carbonate formed, is washed free of sodium nitrate and sodium bicarbonate by decantation, allowing the solid to settle to 20 to 25 percent vessel volume, decanting, and refilling to original volume. Approximately four to six decantations are needed to remove the sodium to the required level. The metal carbonates are filtered, and calcined at 700° F. to form the oxides. The resulting oxides are deaerated and then dried to 5 to 10 percent moisture. The cake is granulated, mixed with 1 to 3 weight percent graphite as a lubricant and pelletized into 3/16-inch tablets on a Stokes tabletting machine. The tablets are then heated for four to ten hours at 300° F. to temper tabletting stresses.

When metals such as alumina were incorporated in the catalyst, the following process was employed.

EXAMPLE 2

Following the procedure set forth in Example 1, a catalyst is made by combining 578 parts by weight of $Zn(NO_3)_2 \cdot 6H_2O$ and 383 parts by weight $$Cu(NO_3)_2 \cdot 6H_2O$$

with the same amount of water used in Example 1. To the calcined reslurried suspension of copper and zinc oxides sufficient alumina is added as $Al_2O_3 \cdot 3H_2O$ so that the quantity of alumina is 16.7 percent of the copper oxide-zinc oxide-alumina composition.

In U.S. 3,388,972 it is pointed out that when a composition containing 16.7 percent alumina was steam reduced, the $K_w$ value of the composition was 12,300, being better because of the presence of alumina. The catalyst is still, nevertheless, sensitive to steam. Tests reported herein showed that by increasing the zinc to copper weight ratio, this value is even further increased.

Conversions conducted using 16.7 percent alumina contents, and the other conversions reported herein, for the most part were determined at 400° F. for the reaction $CO + H_2O \rightleftharpoons CO_2 + H_2$. Hence the $K_w$ values were obtained from conversions in isothermal reactors comprising jacketed iron tubes, conditions being as follows. The catalyst was first reduced by treatment for about eight hours at 500° F. with a mixture of two percent hydrogen in nitrogen gas.

Process conditions

Pressure—150 p.s.i.g.
Temperature—400° F.
Space velocity (dry)—4500 scf.
Space velocity (wet)—9000 scf.
Steam:Gas ratio—1:1 molar ratio.

Reaction gas stream

Carbon monoxide—25% by vol.
Hydrogen—75% by vol.

Additional comparisons of dry and steam reductions using various zinc to copper weight ratios illustrate the advantages of this invention. In dry reduction work nitrogen was used as a carrier gas for the reducing gas. Results are set forth in Table 1. It should be noted that $K_w$ values of about 9000 and above are taken as satisfactory herein. It is also noted that values in Table 1 are not as high as obtainable with a more optimum amount of alumina, 40 percent alumina based on the finished catalyst being employed herein for other purposes. The various compositions given in Table 1 were ¼" by ⅛" tablets containing the 40 percent alumina, and for comparison, zinc to copper weight ratios are given above and below the range of this invention of over 3:1, say 3.3:1 to 5:1.

TABLE 1

| | Catalyst $K_w$ value | |
|---|---|---|
| | Dry reduced | Steam reduced |
| Zn:Cu ratio: | | |
| 1.0:1 | 9,500 | 7,000 |
| 2.0:1 | 9,900 | 7,200 |
| 3.0:1 | 10,200 | 8,950 |
| 3.3:1 | 9,800 | 9,100 |
| 3.6:1 | 9,680 | 9,330 |
| 4.0:1 | 9,420 | 9,580 |
| 4.5:1 | 9,500 | 9,450 |
| 5.0:1 | 8,920 | 8,900 |
| 6.0:1 | 8,310 | 7,000 |
| 9.0:1 | 6,650 | 6,600 |

As can be seen from the foregoing, an increase in the zinc to copper ratios results, for no explainable reason, in a catalyst which can be reduced using a steam stream. By steam reduced we mean that steam can be used as the carrier or diluent for hydrogen or carbon monoxide reducing gas. The reduction, with either steam or nitrogen was carried out by keeping hydrogen in the steam or nitrogen stream at a concentration of 0.2 percent by volume initially, the reduction initiation temperature being at least 250° F., and generally 300° F. to 350° F. This reduction temperature is initially achieved by preheating the catalyst. When hydrogen is virtually all reacted, i.e., when there is essentially no change in hydrogen content of the reducing gas which has passed through the catalyst mass, the concentration of the reducing gas in the diluent gas is increased incrementally until the concentration reaches three volume percent, preferably until it reaches two percent. Here it is held until the catalyst is reduced. By maintaining each incremental increase less than 0.5 volume percent, or at least not exceeding that amount, the temperature is maintained below 500° F. until the reduction is complete. The reduction of the catalyst mass is deemed complete when, as indicated, there is approximately no change in hydrogen content of the reducing gas stream which is passed through the activated actalyst bed, e.g., when less than ten percent of the hydrogen in the stream is consumed. As noted hereinbefore the reduction procedure is not a part of this invention, the invention merely providing a catalyst preparation which can be reduced with steam as the carrier. Methods of making the catalyst and reduction steps are known, and modifications and variations of these processes will occur to those skilled in the art. Such ramifications are deemed to be within the scope of this invention.

What is claimed is:

1. In the process for the preparation of a zinc oxide-copper catalyst effective for the low temperature shift reaction in which steam and carbon monoxide are reacted at a temperature in the range of 350° F. to 550° F. to produce hydrogen, wherein said catalyst is prepared by reducing a catalyst precursor of 45 to 100 weight percent of a combination of zinc oxide and copper oxide, further combined with 0 to 55 weight percent of another metal oxide, the total being 100 percent, and the other metal oxide being selected from the group consisting of $Fe_2O_3$, $Al_2O_3$, $TiO_2$ and MgO, and wherein the reduction is effected by passing through a catalyst precursor mass a reducing gas diluted with steam to such an extent as to maintain the reduction temperature below 500° F. the improvement which renders the precursor capable of being reduced with said steam as the diluent for the reducing gas without loss of activity due to steam which comprises employing zinc oxide and copper oxide in the precursor in a ratio of 3.3:1 to 5:1 based on metals.

2. The process of claim 1 wherein the reducing gas is diluted with steam so that the concentration of reducing gas initially is 0.2 percent by volume, wherein this concentration is increased incrementally still maintaining the reduction temperature below 500° F. until the concentration of the reducing gas reaches 3 volume percent and wherein the 3 percent concentration is maintained until the reduction is complete.

3. The process of claim 2 wherein each incremental increase is less than 0.5 volume percent.

4. The process of claim 1 wherein the zinc oxide to copper oxide ratio is 3.5:1 to 4.5:1.

5. The process of claim 1 wherein the ratio of zinc oxide to copper oxide based on metal is 4:1 and wherein the other metal oxide is $Al_2O_3$.

6. The process of claim 1 wherein the ratio of zinc oxide to copper oxide based on metal is 4:1 and wherein the other metal oxide is $Fe_2O_3$.

7. The process of claim 1 wherein the ratio of zinc oxide to copper oxide based on metal is 4:1 and wherein the other metal oxide is $TiO_2$.

8. The process of claim 1 wherein the ratio of zinc oxide to copper oxide based on metal is 4:1 and wherein the other metal oxide is MgO.

References Cited

UNITED STATES PATENTS

| | | | |
|---|---|---|---|
| 3,388,972 | 6/1968 | Reitmeier | 23—213 |
| 2,193,464 | 3/1940 | Natta | 23—237 |
| 2,524,566 | 10/1950 | Houtman | 260—638 |
| 3,303,001 | 2/1967 | Dienes | 23—213 |
| 1,680,807 | 8/1928 | Schultze | 252—473X |
| 1,834,115 | 12/1931 | Williams | 23—213X |
| 1,330,772 | 2/1920 | Bosch | 23—213X |
| 3,304,268 | 2/1967 | Lester | 252—475 |
| 1,908,696 | 5/1933 | Dodge | 252—475X |

DANIEL E. WYMAN, Primary Examiner

P. M. FRENCH, Assistant Examiner

U.S. Cl. X.R.

23—213; 252—463, 473, 475